(12) United States Patent
Monti

(10) Patent No.: US 7,712,604 B2
(45) Date of Patent: May 11, 2010

(54) DEVICE FOR RECEIVING AND TRANSPORTING ARTICLES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 0 days.

(21) Appl. No.: 12/402,252

(22) Filed: Mar. 11, 2009

(65) Prior Publication Data

US 2009/0260323 A1  Oct. 22, 2009

(30) Foreign Application Priority Data

Apr. 16, 2008  (IT)  ............................ BO2008A0234

(51) Int. Cl.
*B65G 47/84*  (2006.01)
(52) U.S. Cl. .............................. 198/803.8; 198/377.07; 198/473.1; 198/715; 198/803.7
(58) Field of Classification Search ............ 198/377.01, 198/377.07, 470.1, 473.1, 624, 715, 803.7, 198/803.8
See application file for complete search history.

(56) References Cited

U.S. PATENT DOCUMENTS 3,393,799 A * 7/1968 Schmersal .................. 209/527
4,075,086 A * 2/1978 Marsh et al. ................. 209/522
4,200,183 A * 4/1980 Riggs ..................... 198/867.06
4,428,474 A * 1/1984 Gau et al. .................... 198/394
5,373,934 A * 12/1994 Jackson et al. ........... 198/803.8
6,257,820 B1 * 7/2001 Veltman ...................... 414/219
6,742,646 B2 * 6/2004 Sowden et al. ......... 198/377.04
6,745,890 B2 * 6/2004 Nickey et al. ................ 198/379

FOREIGN PATENT DOCUMENTS

DE       9314288 U1   10/1994
IT       1296413 B1    6/1999

OTHER PUBLICATIONS

European Search Report.

* cited by examiner

*Primary Examiner*—Douglas A Hess
(74) *Attorney, Agent, or Firm*—William J. Sapone; Coleman Sudol Sapone P.C.

(57) ABSTRACT

A device for receiving and transporting articles, in particular syringes and the like, of a type comprising a transfer carousel destined to be rotated about a substantially vertical axis peripherally bearing a series of seatings for receiving single articles from a supply station and for transferring the articles to a receiving station. The seatings are fashioned from respective shaped and recessed surfaces realized on respective appendages peripherally associated to the carousel and elastically deformable such as to absorb any variations in size of the articles.

5 Claims, 3 Drawing Sheets

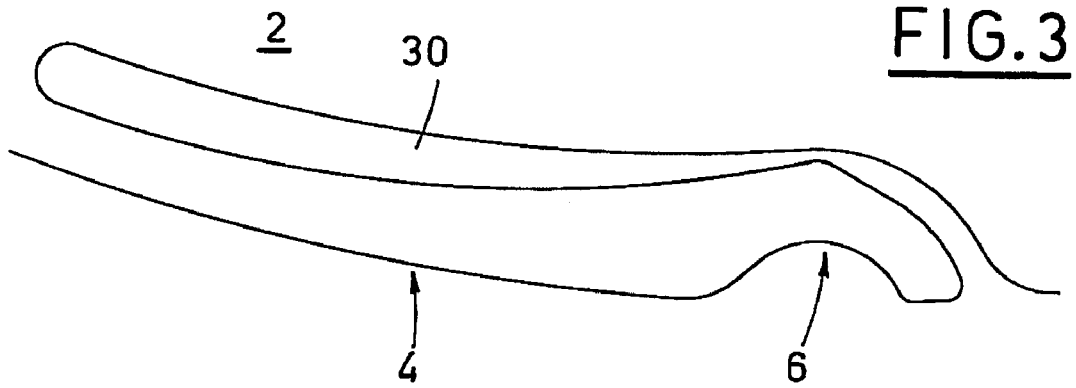
FIG.3
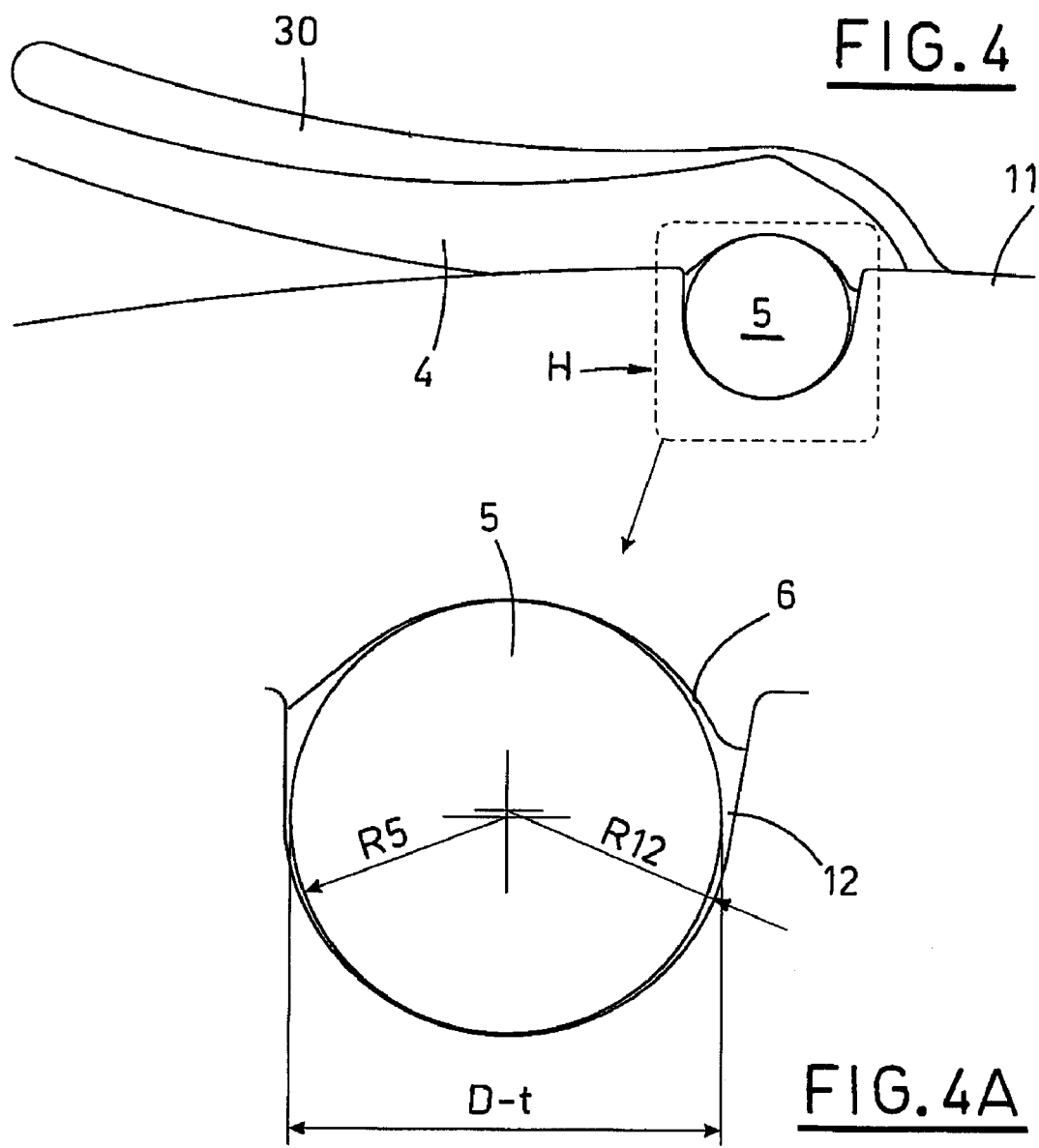
FIG.4
FIG.4A

DEVICE FOR RECEIVING AND TRANSPORTING ARTICLES

BACKGROUND OF THE INVENTION

The invention relates to a device for receiving and transporting articles, in particular syringes and the like.

The prior art comprises apparatus which automatically operate the movement of articles of the above-mentioned type, for example during the stage of production or packing. In the mentioned apparatus, devices are usually present for receiving and transporting articles from a first work station to a second work station, such as for example devices which automatically transfer articles under process from a supply carousel located upstream to a receiving carousel located downstream. In particular, devices are known which comprise an essentially circular carousel, rotated about a substantially vertical axis. The carousel peripherally exhibits a series of specially-shaped seatings, destined each to receive a single article collected from the supply station and provided with suitable blocking means for retaining the article in a predetermined position in order to transfer it to the receiving station.

The above-described devices generally efficiently perform the task of transferring the articles from the upstream supply station to the downstream receiving station. It has however been observed that the known devices can be unsuitable for correct use with articles made of a fragile and poorly-deformable material, such as in particular, syringes and the like. Owing to the dimensional tolerances which are determined during manufacture thereof, these articles can exhibit even significantly different dimensions with respect to rated sizes. This can lead to imperfect coupling of the article with the shaped seating destined to contain it on the transfer carousel, with risks of damage or breakage of the article during the receiving and transporting thereof, especially during the most critical stages of the initial loading and the final unloading.

By way of example, FIG. 2 partially illustrates a syringe 5 having a conventional cylindrical shape with an annular edge 15; the manufacturing dimensional tolerances of the syringe 5 are indicated as D±t for the external diameter and R±t for the connecting radius of the annular edge.

SUMMARY OF THE INVENTION

The task of the present invention is to resolve the above-cited problem, by providing a device for receiving and transporting articles such as syringes and the like which device avoids possible damage to the articles during the stages of transfer from a first work station to a second work station.

In the ambit of the task, a further aim of the present invention is to provide a device of simple conception, which is operationally reliable and versatile in use.

The above-cited aims are achieved by means of a device for receiving and transporting articles, in particular syringes and the like, which comprises a transfer carousel destined to be rotated about a substantially vertical axis peripherally bearing a series of seatings for receiving single articles from a supply station and for transferring the articles to a receiving station, wherein the seatings are fashioned from respective shaped and recessed surfaces realized on respective appendages peripherally associated to the carousel and elastically deformable such as to absorb any variations in a size of the articles.

BRIEF DESCRIPTION OF THE DRAWINGS

The characteristics of the invention are illustrated in the following, with particular reference to the accompanying figures of the drawings, in which:

FIG. 3 is a schematic plan view of the detail J of FIG. 2, in larger scale than FIG. 2;

FIGS. 4 and 5 illustrate a plan view of the same detail as in FIG. 3, destined to receive an article, position W of FIG. 2, having diameters which are respectively smaller than and greater than a rated diameter;

FIGS. 4A and 5A illustrate details H and K of FIGS. 4 and 5, in larger scale.

DESCRIPTION OF THE PREFERRED EMBODIMENTS

Figure 2:
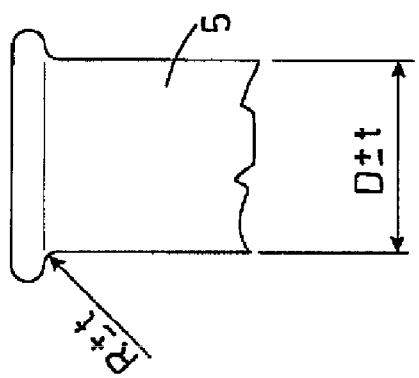
FIG. 2 is a front view of a part of an article destined to be transported by the device of the invention.
Figure 1:
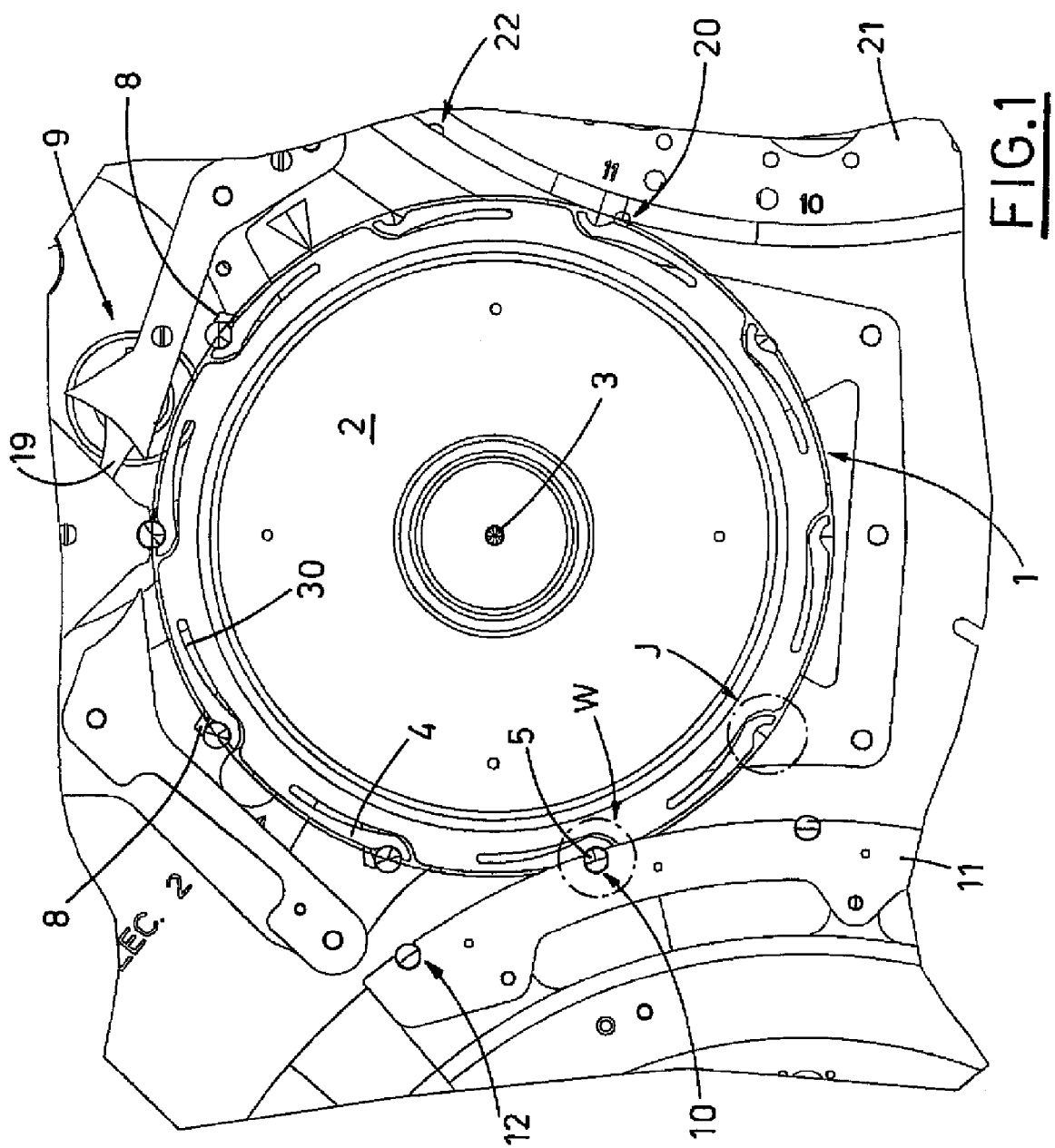
FIG. 1 illustrates a plan view of the receiving and transport device of the invention.

With special reference to the figures of the drawings, 1 denotes in its entirety the device for receiving and transporting the articles in object. The device 1 is destined to be used in an apparatus for the transporting of articles 5 such as syringes, comprising at least a supply station 10 located upstream and a receiving station 20 located downstream. The supply station 10 and receiving station 20 are constituted, in a known way, by a carousel 11, 21 which is rotated in continuous motion or in step-motion, and is peripherally provided with special seatings 12, 22, regularly distanced and destined to receive single articles to be transported.

The device 1 comprises a transfer carousel 2 essentially having a circular disc shape, destined to be activated in rotation about an axis 3 which is parallel to the rotation axes of the carousels 11, 21, which axes are for example vertical. The transfer carousel 2 peripherally exhibits a series of appendages 4 which are suitably distanced and oriented substantially tangentially, and are elastically deformable in flexion in a radial direction with respect to the carousel 2. In more detail, the appendages 4 are constituted by small plates, fashioned from cuts 30 made in the lateral surface of the disc 2, an extension, shape and orientation of which can be determined in accordance with the degree of elasticity to be obtained and the shape of the product to be processed.

At the free end thereof, the appendages 4 exhibit a shaped recessed surface exhibiting a seating 6 facing externally which receives a single article 5 to be transported. Owing to the flexibility of the appendage 4, the seating is mobile in a centripetal direction for the tract allowed by the depth of the cut made in the disc 2.

A blocking organ 8 is located at each appendage 4, which blocking organ 8 is destined to retain each article 5 in a coupling with the respective seating 6, during the stage of transport. The blocking organ 8 is preferably constituted by an oscillating tooth, destined to be rotated between a locking position and a disengaged position, for example on command of a cam mechanism of known type, not illustrated.

The functioning of the device for receiving and transporting the articles of the invention is illustrated herein below.

Figure 5:
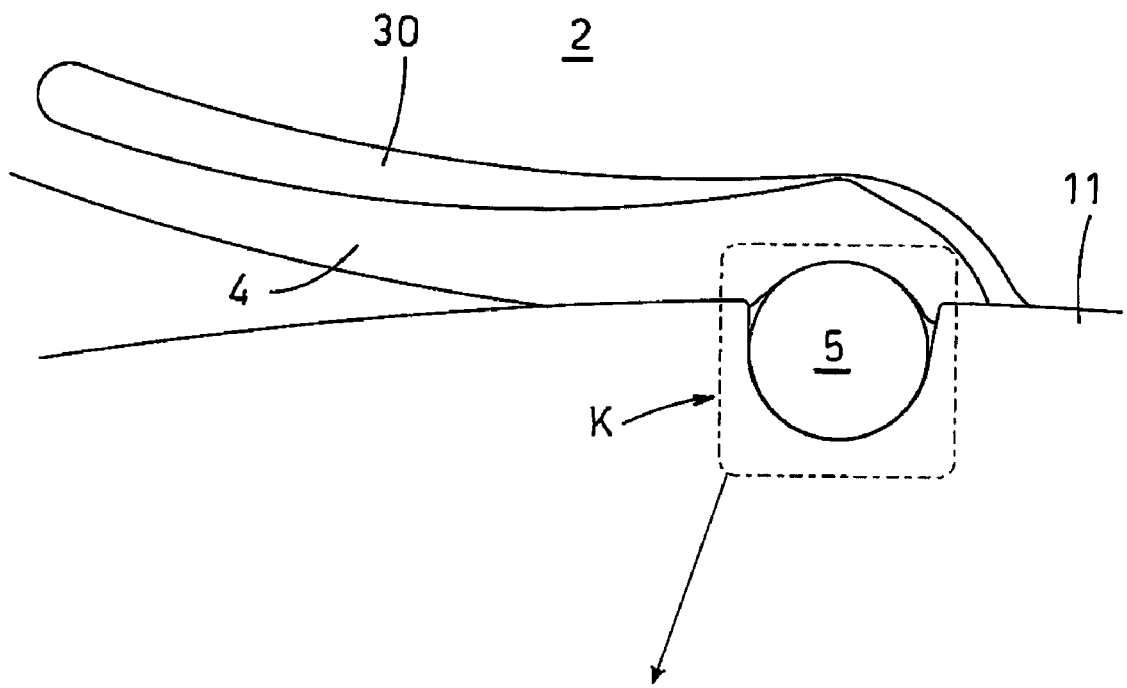

The transfer carousel 2 is rotated in suitable phase relation with the carousels 11, 21 of the work stations 10, 20. In particular, the carousel 2 moves at such a speed that each appendage 4 is positioned at an article 5 borne by the first carousel 11 in the supply station 10. When the article 5 comes into contact with the shaped surface 6, it is released by the supply station 10 and is contemporaneously blocked in a gripped position by the rotating of the oscillating tooth 8. During this stage (illustrated in FIGS. 4 and 5 in which the tooth 8 is not illustrated), the radial elastic deformation of the appendage 4 is able to absorb any stress deriving from the imperfect coupling of the article 5 with the shaped surface 6, which otherwise would damage or break the article 5. The imperfections in the coupling are essentially due to the possible irregularities of shape and other dimensional manufacturing tolerances of the transported article, in particular tolerance±t with respect to the diameter D and tolerance±t with respect to the connecting radius R (see FIG. 2). The shaped surfaces 6 are sized on the basis of the rated diameter of the articles to be transported, and thus any departures from the rated sizes of the products lead to an imperfect adaptation among the surfaces in contact.

Figure 5A:
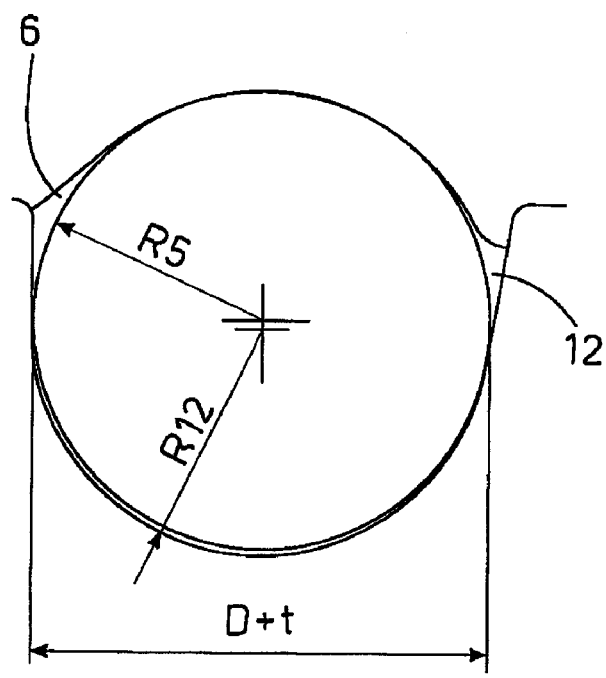

The limit situations, with the article 5 respectively having a diameter of D−t and D+t, are represented in FIGS. 4A, 5A in which $R_5$ denotes the radius of the article 5 and $R_{12}$ the radius of the seating 12 fashioned in the carousel 11.

Thereafter, the article 5 is maintained in blocked position and the carousel 2 is rotated until it reaches the release point at the receiving station 20. During the final unloading stage, the oscillating tooth 8 rotates into a disengaged position in order to free the article 5 which is transferred to the second carousel 21 of the receiving station 20.

It is further possible to include passage of the transfer carousel 2 at a reject station 9 of the defective articles 5. This reject station 9 further comprises an intercepting organ 19 constituted by a rocker organ which intercepts any defective articles and deviates them externally of the transport line. In a case in which the presence of a defective article is detected, the intercepting organ 19 is activated by a mechanism of known type, in order to separate the defective article from the seating 6 and enable it to be deviated and distanced from the transport line.

Obviously at the transport line of the articles 5 defined by the transfer carousel 2 further work stations might be predisposed for realizing specific treatment stages of the articles 5.

The device for receiving and transporting articles of syringe type thus attains the aim of preventing possible damaging of the articles during the loading, transporting and unloading stage, in particular during the loading stage (station 10). This is specifically obtained thanks to the elastic deformation of the appendage 4, which is able to absorb the stresses to which the transported products are subjected. In particular, should the size of the article 5 be smaller than the rated dimensions, a limited flexion of the appendage 4 is determined (see FIG. 4); should, on the other hand, the size of the article 5 be greater than the rated size, a greater flexion of the appendage 4 is produced (see FIGS. 5, 5A).

An advantage of the described device for receiving and transporting articles is constituted by the fact that the elasticity of the appendages 4 is usefully exploited for easing the positional blocking of the article 5 by the blocking organ 8, thus absorbing the compression stresses and preventing risk of damage to the article.

A further advantage of the device is given by the fact that the above-mentioned aim is attained by means of a solution having great constructional and functional simplicity, as well as being provided with great versatility in relation to the various conformations of the articles to be dealt with.

The above has been described by way of non-limiting example, such that any constructional variations are considered to fall within the protective ambit of the present technical solution, as described above and as claimed herein below.

What is claimed:

1. A device for receiving and transporting articles, the device comprising a transfer carousel being a disk rotated about a substantially vertical axis peripherally bearing a series of seatings for receiving single articles from a supply station and for transferring the articles to a receiving station, the seatings formed by respective shaped and recessed surfaces provided on respective appendages peripherally associated to the carousel, the appendages being elastically deformable so as to absorb any variations in a size of the articles, the appendages constituted by respective plates, spaced apart and orientated in a tangential direction relative to the carousel and being elastically flexibly deformable in a radial direction with respect to the carousel, the plates being formed by cuts made in a lateral surface of the disk, an extension, a shape and an orientation of the cuts corresponding to a degree of deformability sufficient for the plates to adapt to a shape of an article to be processed, the flexible appendages being deformable into a space provided by the cut so as to accommodate articles of various sizes, a free end of each appendage having a shaped recessed surface for providing a seat for receiving an article to be transported, the flexibility of the appendages permitting movement of the seat during receipt, transport and discharge of the article therefrom.

2. The device of claim 1, which comprises blocking means for cooperating respectively with the appendages for retaining the articles in position in a respective seating during the transport stage.

3. The device of claim 2, wherein the blocking means are constituted by teeth borne oscillatingly at the appendages, the teeth being rotatable between a locking position for locking an article in a seating and a disengagement position for disengaging the teeth from the article.

4. The device of claim 1 further comprising, a reject station having intercepting means for selectively intercepting defective articles borne by the appendages of the carousel.

5. The device of claim 4, wherein the intercepting means comprise a rocker organ for deviating the defective articles away from a transport line defined by the carousel.

* * * * *